United States Patent
Tranovich

[11] Patent Number: 6,034,499
[45] Date of Patent: Mar. 7, 2000

[54] METHOD OF CONTROLLING ROTARY POSITION OF A TORQUE MOTOR

[76] Inventor: Stephen J. Tranovich, 27348 Brighton Dr., Valencia, Calif. 91354

[21] Appl. No.: 09/052,405

[22] Filed: Mar. 31, 1998

Related U.S. Application Data

[60] Provisional application No. 60/042,479, Apr. 1, 1997.

[51] Int. Cl.[7] .................................................. G05F 1/10
[52] U.S. Cl. ........................................... 318/650; 318/254
[58] Field of Search ..................... 318/138, 254, 318/439, 466, 560, 650, 652, 653, 684, 689, 671

[56] References Cited

U.S. PATENT DOCUMENTS

| | | | |
|---|---|---|---|
| 3,644,763 | 2/1972 | Skrubisch | 310/36 |
| 4,392,094 | 7/1983 | Kühnlein | 318/254 |
| 4,494,051 | 1/1985 | Bailey | 318/254 |
| 4,570,118 | 2/1986 | Tomczak et al. | 324/208 |
| 4,642,496 | 2/1987 | Kerviel et al. | 310/68 |
| 4,644,234 | 2/1987 | Nola | 318/254 |
| 4,697,125 | 9/1987 | Goff et al. | 318/254 |
| 4,751,438 | 12/1985 | Markunas | 318/254 |
| 4,789,826 | 12/1988 | Willett | 324/208 |
| 4,809,742 | 3/1989 | Grau | 137/554 |
| 4,874,997 | 10/1989 | Daggett et al. | 318/568 |
| 5,148,070 | 9/1992 | Frye et al. | 310/168 |
| 5,159,268 | 10/1992 | Wu | 324/207 |
| 5,173,651 | 12/1992 | Buckley et al. | 318/701 |
| 5,225,770 | 7/1993 | Montague | 324/146 |
| 5,313,127 | 5/1994 | Danley et al. | 310/36 |
| 5,313,151 | 5/1994 | Ogden et al. | 318/805 |
| 5,325,005 | 6/1994 | Denk | 310/68 B |
| 5,382,890 | 1/1995 | Moh et al. | 318/254 |
| 5,619,112 | 4/1997 | Younessi et al. | 318/689 |

*Primary Examiner*—Robert E. Nappi
*Assistant Examiner*—Rina I. Duda
*Attorney, Agent, or Firm*—Cantor Colburn LLP

[57] ABSTRACT

A control system is provided for a limited angle torque motor used as a rotary position control device. A motor for which the system is intended would consist of a rotor and a stator. The system uses an analog Hall-effect sensor to sense the position of the rotor. Rather than attempting to shield the Hall-effect sensor from the influences of magnetic fields generated by the field windings in the stator during motor operation, the system allows the output signal from the Hall effect sensor to contain elements of both the angular position and the extraneous magnetic field generated by the field windings of the motor. Current feedback from a circuit which independently senses the motor current is then combined with this signal to eliminate the influence of the motor coil magnetic field. The system is applicable to a number of limited angle torque motor designs. A preferred embodiment is shown wherein a unique sandwich construction of the rotor magnets on a soft iron rotor core provides a highly linear angular position signal for the system to process. Furthermore, a means of fixturing the Hall-effect sensor within the motor end windings to facilitate the position sensing for the preferred embodiment is described. Finally, a detailed description of the electronic circuit used to implement the system in the preferred embodiment is provided, and a number of alternate analog and digital implementations of the circuit are discussed.

10 Claims, 5 Drawing Sheets

METHOD OF CONTROLLING ROTARY POSITION OF A TORQUE MOTOR

CROSS REFERENCE TO PROVISIONAL PATENT APPLICATION

This invention is the subject of a Provisional Patent Application filed by the applicant on Apr. 1, 1997. The title of the Provisional Patent Application was "Current Feedback Stabilization for Limited Angle Torque Motor Control". The Application number is 06/042,479.

FIELD OF THE INVENTION

This invention relates primarily to limited-angle direct current torque motors used for closed loop servo positioning, such as are used in the construction of electro-hydraulic and electro-pneumatic servovalves, and specifically to a control system facilitating the use of hall-effect sensors for precise position feedback therein.

BACKGROUND

While most electric motor applications involve continuous rotation of a motor shaft when an electric current is applied, some applications require precise control of the angle of the output shaft in response to an angular position command. For example, one important application is driving a valve spool in electro-hydraulic and electropneumatic servovalves. Additional applications include positioning a robotic arm, positioning an actuator for a computer disk drive, or even moving the air modulation device in a low frequency loud speaker. In all of these applications, the rotation of the motor is restricted to a limited angle of less than 360 degrees. In order to provide good system performance in these positioning applications, it is advantageous to measure the position of the rotary actuator or motor and process this position information in a control circuit to provide real-time updated torque command signal to the motor to compensate for loads, non-linearities, and other internal and external influences on the system. Many devices have been proposed in the prior art to provide angular position information in such applications, including potentiometers, optical encoders, capacitive transducers, variable reactance magnetic coils, and Hall-effect devices. Modern Hall-effect devices have many advantages, including very low cost, the availability of small, highly integrated packages, good temperature characteristics, and ruggedness. While use of Hall effect devices in a digital or switching mode for motor commutation is quite common in the prior art, some problems have been found with the application of Hall-effect devices for precise analog position feedback in electric motors. For example, the field windings of the electric motor create a magnetic field when energized to which the Hall-effect device can undesireably react, causing a false position signal to be fed back to the system. Furthermore, it has proven difficult in general purpose application of analog Hall-effect sensors to obtain an accurate output from the Hall-effect device that is proportional to the angle of rotation of a rotating element. The prior art discussed in the next section is that which relates to closed-loop control of electric motor position, the use of Hall-effect sensors to provide precise, linearly proportional, analog position information, and the application of Hall-effect sensors in electric motors where analog output is used or digital applications where motor winding interaction problems are noted. Other prior art pertaining to other elements of the system which constitutes this invention is discussed in the body of the specification.

DESCRIPTION OF PRIOR ART

The problem of precisely controlling the position of an limited angle electrical actuator or motor responsive to an electrical command signal is well known in the prior art. Such positioning systems can be either open-loop or closed loop types. Open-loop refers to a system without position feedback wherein the variable output torque of the motor is driven into a mechanical spring or other returning device such that the position correspond roughly to the applied input torque. The disadvantages of such a system are discussed in detail in U.S. Pat. No. 5,619,112 to Younessi and Houghton, which patent will be discussed in greater detail below. Closed-loop refers to a system which incorporates position feedback responsive to the angular position of the motor and means for comparing this feedback with the commanded position. The difference between these parameters then determines the amount and direction of a corrective output from the system to drive the motor toward the commanded position. The present invention is a closed-loop type of system. The aforementioned patent to Younessi and Houghton shows the use of angular position feedback to accomplish closed-loop control of a unique limited angle torque motor with windings that are in phase opposition. No mention is made of the specific type of transducer which is used to provide the required position feedback to the system, nor of any special control scheme to accommodate a particular transducer characteristic. Another good example of a closed-loop positioning system directed at this problem is U.S. Pat. No. 3,644,763 to Skrobisch which utilizes a potentiometer to provide position feedback for the limited angle rotary motor. Potentiometers have the advantage of being immune to the magnetic effects attributable to the field windings of the motor, but they are generally considered to be unreliable and prone to wear due to the contact required between the wiper and the resistive element. Furthermore, a potentiometer is a bulky addition to the motor package. One prior art patent which uses magnetic feedback to provide control information for a limited-angle motor driving a valve is U.S. Pat. No. 4,809,742 to Grau. Grau discloses a position monitoring system for a valve which incorporates a saturable reactor or coil which is disposed so as to be influenced directly by the flux generated by the permanent magnet of the rotor. By providing a high frequency alternating current to this reactor as compared to any frequency of interest applied to the field windings in the stator, the reactance indicating the position can theoretically be isolated from the effects of the field. This system is electronically complex, requires multiple signal sources, and requires carefully matched capacitors and inductors to separate the frequencies. Furthermore, it is susceptible to external electromagnetic interference and to internally generated interference from transients such as might be generated by square wave inputs commonly applied to servopositioning systems.

Use of analog hall effect sensors to provide precise angular position sensing for a variety of general purpose applications is exemplified in the prior art by U.S. Pat. No. 4,570,118 to Tomczak and Osladil, U.S. Pat. No. 5,159,268 to Wu, and U.S. Pat. No. 4,789,826 to Willett. All of these patents discuss the difficulty in the prior art of making a structure which provides a magnetic field which varies linearly as it is rotated with respect to a Hall-effect device. Wu in particular describes the common prior art approach of using a generally circular magnet having a north pole and a south pole rotated about an axis of rotation and a Hall element which is disposed a predefined distance from that axis of rotation. In this case, the Hall-effect device will experience a magnetic field whose strength varies as a sinusoidal function of the position of the magnet. For dealing with the difficulty of obtaining a linear output, the Tomczak patent discloses a structure consisting of a pair of magnetic disks arranged parallel to each other on the same axis of rotation, but at an angle to the axis of rotation other than perpendicular. The analog Hall-effect device is interposed between these disks and the required linear variation in magnetic flux with angular motion of the axle is obtained. This structure is more elaborate than desired and is not readily adaptable to a compact electric motor design. The Wu patent discloses shaped magnets to provide linear variation in output with rotation of the device. While the Wu structure is simpler and more compact, the fabrication of a magnet with the particular shape required to obtain the linear output is expensive. Willett discloses a mechanism consisting of a Hall-effect sensor positioned so as to be at or near the magnetic null of a ring magnet containing a single pole pair, and at a fixed distance therefrom. Effectively, this approach uses a very limited range of the sinusoidal output described by Wu to approximate a linear function. This approach may be adaptable to service as the feedback device for a limited angle motor, but certain problems of implementation remain. If a separate ring magnet is not used to provide the required magnetic field in this approach, linear output over a useful range of motion of the rotor is compromised. The high coercivity magnets used in torque motors generate a magnetic flux density which is very high compared to the sensitivity of Hall-effect device packages which are readily available. This tends to severely limit the range of motion of the rotor before the Hall-effect device is saturated and therefore no longer provides a linear output. Willett suggests that his approach can also be applied to a shaft extending from the axis of the ring magnet, but the radius of a typical motor shaft will not provide sufficient arc length at its outer periphery to allow acceptable sensitivity or resolution with this approach. From the foregoing, it is apparent that any control system adapted to the use of a Hall-effect device to provide position feedback requires a magnetic field which varies linearly with the angle of rotation of the permanent magnet structure with respect to the structure containing the Hall-effect device. Prior art approaches to obtaining this system element have drawbacks which limit their usefulness in a limited-angle torque motor application.

Use of a Hall-effect device in conjunction with a permanent magnet either attached to the rotor of a motor, or incorporated into the rotor itself for providing a commutation angle switching function is common in the prior art. Generally, such applications do not require an analog output from the Hall-effect sensor, do not require an output which varies proportionately to position, and do not require a great deal of accuracy in measuring position. More relevant are cases where such devices have been used in analog mode, as opposed to a switching mode or digital mode, as in U.S. Pat. No. 4,697,125 to Goff et al. The Goff patent discloses the use of analog Hall-effect devices used to generate position information in an electric motor, but the mode of operation of these devices is continuous rotation, in the course of which they produce sinusoidal outputs as explained in the Wu patent, above. Goff further uses this information to generate digital commutation information.

In some applications, it has been recognized in the prior art that the proximity of Hall-effect devices used for commutation to the field windings of an electric motor can result in undesirable interference with the Hall-effect devices. U.S. Pat. No. 5,325,005 to Denk discusses this effect and provides a solution in the form of a shield which is interposed between the field coil windings and the Hall-effect devices. The Denk patent also discloses a second magnetic armature aligned with the primary armature and having like magnetic poles which is used to provide the magnetic flux to the sensors. While this method provides immunity from the electromagnetic effects generated by current through the field coil windings, which improves the accuracy of the information used for commutation, it does involve manufacture of the second magnetic armature and the shield structure, which contribute to motor complication and cost. U.S. Pat. No. 4,642,496 to Kerviel also uses Hall-effect devices for commutation. To avoid inaccuracies which come about when a Hall-effect device is placed in the magnetic field between the rotor and stator, Kerviel uses a separate disk which is magnetic on its radial plane and which faces a plane containing a plurality of Hall-effect sensors mounted on a circuit board. This approach also requires additional structure and a separate magnetic source, and is thus more costly and less compact than is desired. Neither of these mechanisms, which are directed at commutation, use or require a linear analog output from the Hall-effect sensors. A commutation application for the Hall-effect sensor which recognizes the problem of field coil winding interference and which deals with this problem electronically is U.S. Pat. No. 4,392,094 to Kuhnlien. He discloses a commutation system in which Hall-effect sensors are introduced into the air gap between the rotor and stator of a brushless DC motor, and are thus exposed directly to both the flux from the rotor and the flux generated by the field coil windings. The component of the Hall-effect output caused by the magnetic flux from the rotation of the rotor is a sinusoid as described earlier by Wu. By controlling the current through the coils to a known sinusoidal waveshape, the output of the Hall-effect sensors is converted to a switching function more reliably matched to the positions required for commutation. This system is not, however, suited for a position control application where sinusoidal current waveforms are not used, and instead the applied current is a random output determined by the load and position of the rotor and the variations in the position command signal.

OBJECTS AND ADVANTAGES

Accordingly, several objects and advantages of the present invention are
a) to provide a closed loop control system for a limited-angle brushless DC torque motor which has good sensitivity and resolution and provides an output position which accurately reflects the command signal;
b) to add minimal size and weight to the electric motor package from the control system components;
c) to use components which are few in number, simple in construction, do not require special machining or processing, and are thus inexpensive;
d) to provide a system whereby careful selection and matching of control system components is not required;
e) to use non-contact position sensing means which are not subject to wear;
f) to provide a system which is not subject to electromagnetic interference generated either externally or internally from interaction effects with the magnetic field produced by the field coil windings;
g) to provide a system wherein the command signals are not restricted to any particular waveform or frequency.

Other objects and advantages are to provide a control system which uses simple, readily available electronic components and which can be implemented using any of a variety of well-known control methods best suited to the application. Still further objects and advantages of the invention will become apparent from considerations of the drawings and ensuing description.

DETAILED DESCRIPTION OF THE INVENTION

Figure 1:
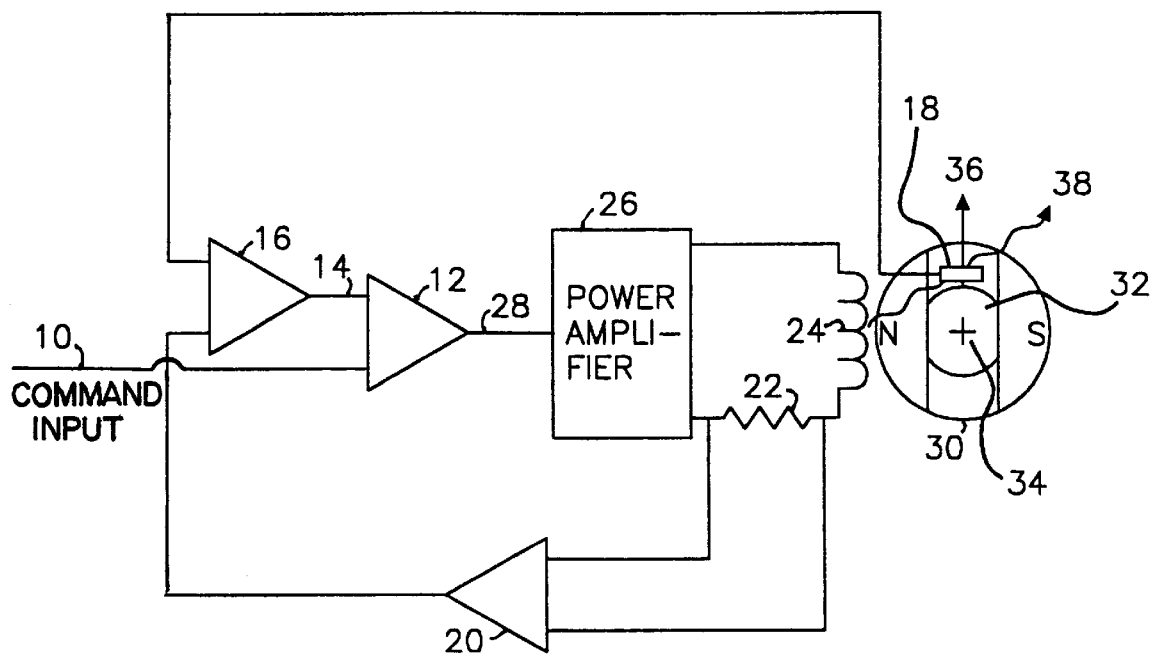
FIG. 1 is a simplified system schematic diagram showing relationships of the magnetic field elements to the Hall-effect device, the signal paths for the position feedback and current feedback, and the preferred arrangement of summing amplifiers for processing these signals.

Referring first to FIG. 1, a simplified schematic representation of the control system is shown. In this figure, summing amplifiers are represented by triangles with two inputs at the base and a single output at the apex. A command input signal which represents the desired angular position of the rotor is presented to the system at input (10) into a first summing amplifier circuit (12). The other input of this amplifier is connected to receive a corrected position output (14) from a second summing amplifier circuit (16) which, in turn, has as one of its inputs from the Hall-effect sensor which is shown schematically as a rectangle at (18). The other input is from a current sensing amplifier (20). The inputs to the current sensing amplifier are connected across the terminals of a current sensing resistor (22) which is in series with the motor coils represented schematically at (24). The combination of the motor coils in series with the current sensing resistor is connected to the output of a power amplifier circuit represented by the rectangle (26) and described more fully below. The input to the power amplifier is a position error signal (28) provided at the output of the first summing amplifier.

Various limited angle torque motor structures are well known in the prior art, and some references are provided below to better illustrate the design and principles of operation of the motor used in the preferred embodiment. The type of motor to which this invention is directed typically has a rotor which incorporates permanent magnets to form at least one set of opposite magnetic poles at its diameter and a stator which surrounds the rotor and has the field coil windings and soft iron return path for the magnetic flux. The rotor which is shown schematically in FIG. 1 uses a single pole pair which is labeled N and S in the figure. The specific embodiment shown is a rotor with an axial projection, the core extension, in the direction of the viewer which is smaller in diameter than the main magnetic portion of the rotor and is labeled (32). The relationship of the core extension to the body of the rotor in this preferred embodiment is better illustrated in FIG. 4, and will be explained in detail below. It can be seen in FIG. 1 that the core extension (32) is the portion of the rotor to which the Hall-effect sensor is directed. The details of the preferred structure for holding the Hall-effect sensor in fixed relationship to the core extension will also be explained below, and are omitted from this schematic figure. The axis of rotation of the rotor is shown as a cross at (34). Two magnetic flux components impinge on the Hall effect sensor. The first is from the permanent magnetic structure of the rotor, in this case the core extension. The magnitude of the flux generated by this component is generally linear and proportional to the angular position of the rotor in the preferred embodiment. This position flux is represented by the straight arrow at (36). The second flux component is from the current flowing through the field coils. This component is variable depending on the instantaneous current flowing through the field coils. This field flux is represented by the wavy arrow (38).

Figure 2:
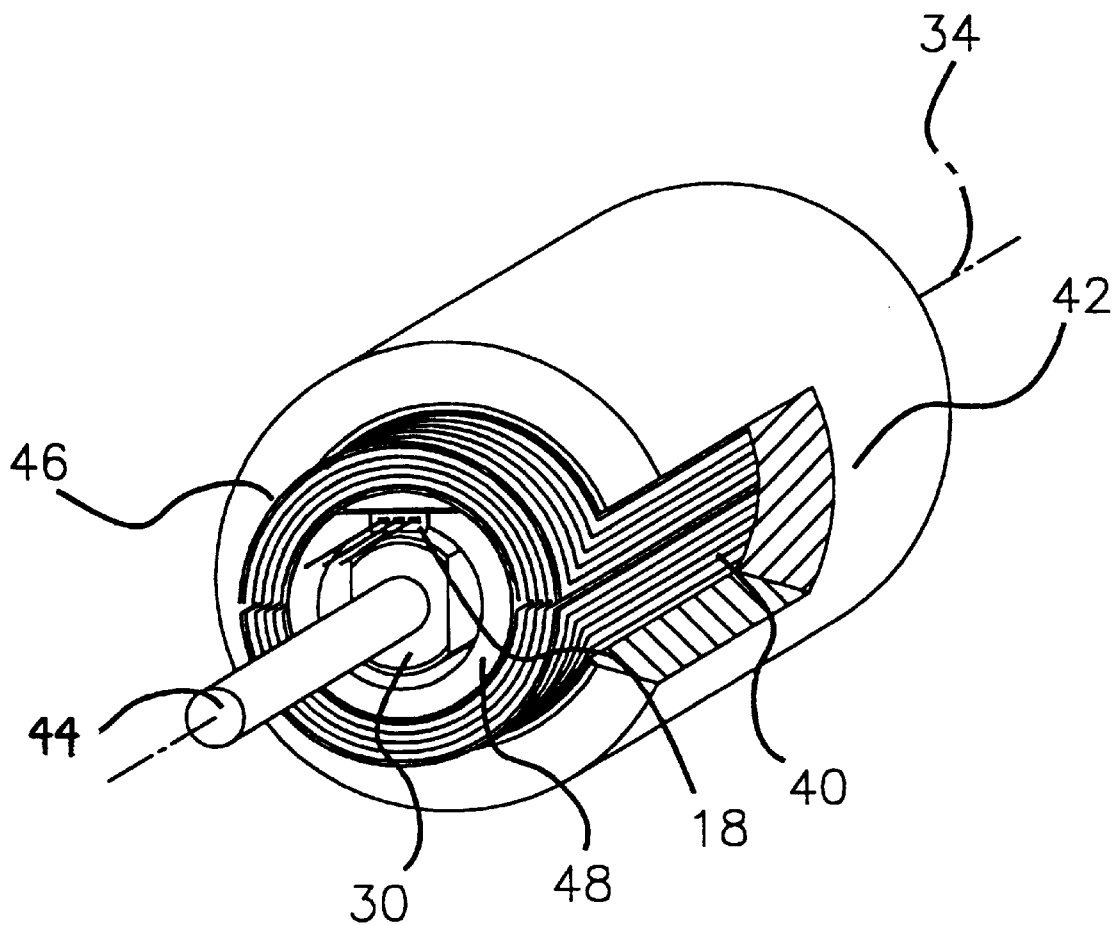
FIG. 2 shows a perspective drawing of a limited-angle torque motor incorporating the position feedback mechanism of the system, with a partial cross section to illustrate motor field windings.

Referring now to FIG. 2, a perspective view of a slotless limited-angle torque motor used in the preferred embodiment is shown, particularly the end containing the position feedback mechanism for the control system in the present invention. In the embodiment illustrated, the motor is of the slotless two-pole type wherein field coils (40) are disposed within and affixed to a hollow cylindrical backiron (42). The combination of the field coils and the backiron is hereinafter referred to as the stator. The permanent-magnet rotor (30) is disposed within the stator and can be rotated therein about the axis of rotation (34). The rotor is typically supported by bearings in other housing structure, which is not shown. A motor shaft is shown at (44) which is integral with the rotor or affixed thereto as described below.

For reference, motors with the type of construction used in the preferred embodiment are shown in U.S. Pat. No. 5,225,770 to Montague, and U.S. Pat. No. 5,313,127 to Danley. In this type of motor, the portion of the field coils which is parallel to the rotor axis and within the backiron provides the active magnetic field which interacts with the motor field to produce torque. The rotor is disposed within the stator such that, when the motor is in its null position, the magnetic poles each bisect the arc segments formed by the cross section of the field coils within the backiron. The semi-cylindrical portion of each coil which is outside of the backiron serves only to conduct the electric current to the other leg of the same coil, and magnetic fields produced by them provide no torque or function in the motor. Together this portion of the windings from the two coils in the motor illustrated form a hollow cylinder at each end of the motor, hereinafter referred to as the end windings (46). Motors with a slotted design and motors with multiple poles also generally have end windings that protrude beyond the backiron, and it will be apparent to those skilled in the art that the structure described for the preferred embodiment of the invention can be readily applied to such a slotted design as well.

Concentric with the end windings and bonded thereto with a suitable adhesive is a carrier assembly (48) which incorporates the Hall-effect sensor (18).

Figure 3:
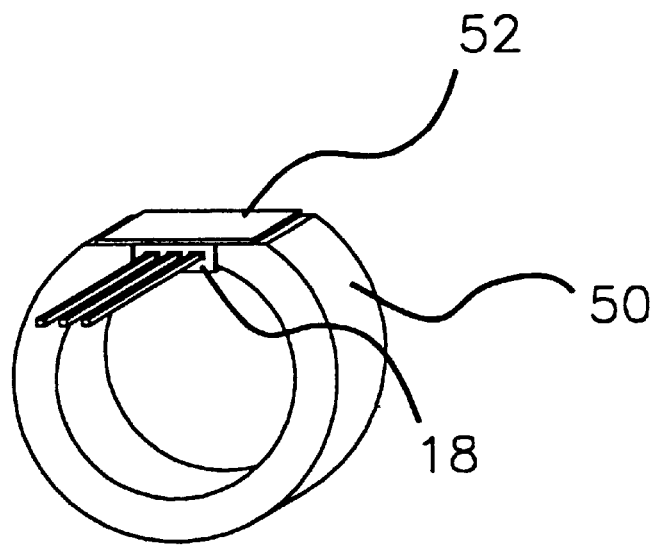
FIG. 3 shows the Hall-effect sensor carrier assembly removed from the motor of FIG. 2.

This carrier assembly is more clearly illustrated removed from the motor as in FIG. 3. The assembly consists of a hollow cylindrical carrier ring (50) made of a non-magnetic material such as plastic, whose outer surface is bonded to the end windings in the next assembly. Bonded to this ring is a soft-iron intensifier plate (52) which serves to focus the magnetic flux from the rotor into the Hall-effect sensor (18). The Hall effect sensor is bonded, in turn, to both the intensifier plate and the carrier with a suitable adhesive. In other embodiments, the Hall-effect device may be bonded directly to the windings of the motor with a suitable high-strength adhesive without any additional structure, or the shape of the structure may be modified to suit a particular implementation, without departing from the teachings of this invention. The Hall-effect sensor used in the preferred embodiment of the invention is part number A3516LU available from Allegro Microsystems, Inc., Worcester, Mass.

Figure 4:
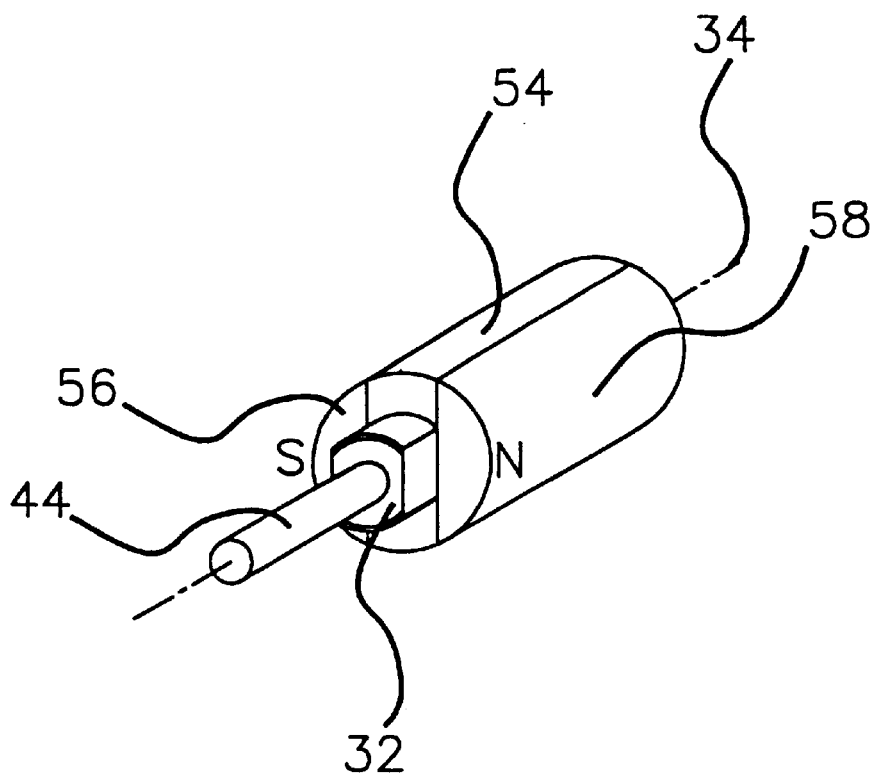
FIG. 4 shows the rotor removed from the motor of FIG. 2 to more clearly show the magnetic structure for providing the flux used for position feedback.

FIG. 4 illustrates the rotor of the electric motor from FIG. 1, removed to show its structure in more detail. In the preferred embodiment of the control system, the rotor consists of a soft iron core (54) which has two planar surfaces parallel to the axis of rotation (34) and spaced equidistantly therefrom. Bonded to these surfaces with a suitable adhesive are two high-coercivity magnet segments (56) and (58), which in the preferred embodiment are neodymium-iron material. The outer surface of the thus assembled rotor may be formed into a cylindrical shape concentric with the axis of rotation of the rotor. The magnet segments are polarized across the diameter of the cylinder perpendicular to the rotor core as shown by the N and S pole designations. One end of this cylinder may be a plane radial to the axis. In the preferred embodiment, the other end has an extension of the soft iron core, the core extension (32), which is partially cylindrical in form and is also concentric with the axis of rotation, but is smaller in diameter than the cylinder formed by the portion of the rotor having the permanent magnets. As was discussed above it is this portion of the rotor to which the Hall-effect sensor is directed in the assembly in the preferred embodiment. The rotor core may be hollow at its axis to accommodate a shaft (44) which may be affixed thereto with fasteners, adhesives, press-fit or the like. Alternatively, the shaft may be formed as an extension of the rotor core.

Figure 5:
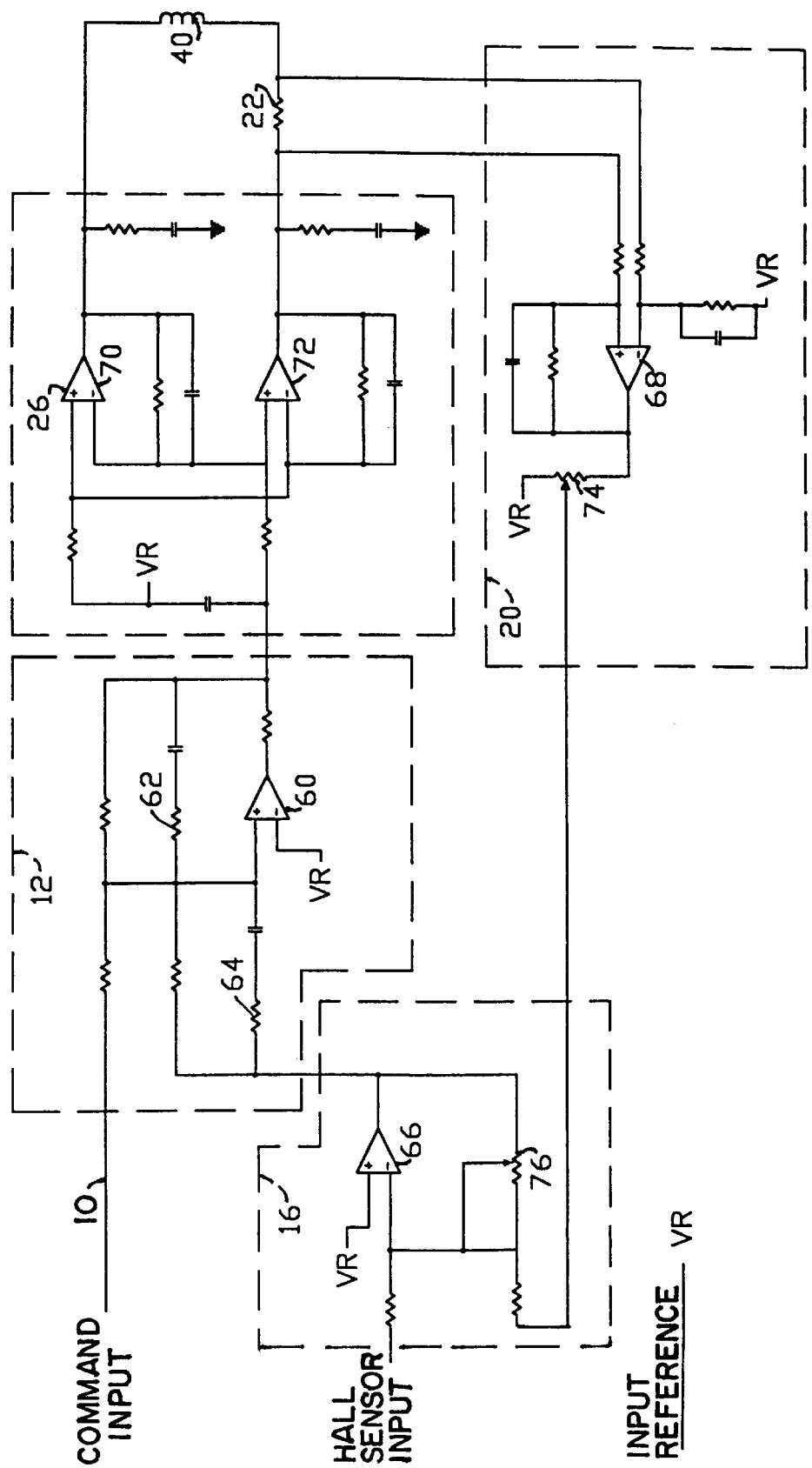
FIG. 5 is an electronic schematic diagram of the preferred implementation using all analog components.

Referring now to FIG. 5, the preferred implementation of the electronics for the control system is described. Note that the amplifiers in this preferred embodiment are standard operational amplifiers, or op amps, configured in well known circuits. Circuit elements analogous to the amplifiers of the simplified control system schematic of FIG. 1 are enclosed in dashed lines to facilitate comparison. The first summing amplifier circuit (12) is implemented in this preferred embodiment as an inverting amplifier with two inputs using a first op amp (60). Resistor/capacitor networks (62) and (64) are provided in this amplifier stage for lead and lag compensation. One input to this stage is from the command (10). The other is from the second summing amplifier circuit (16), which uses a second op amp (66). This is also a standard inverting amplifier with two inputs, one from the Hall-effect sensor (not shown) and one from the current sensing amplifier circuit (20). This current sensing amplifier is implemented as a standard differential amplifier with appropriate filtering using a third op amp (68). Its inputs are connected across the current sensing resistor (22), which is a low resistance, high power resistor. The power amplifier (26) consists of a pair of high power operational amplifiers (70) and (72) which are connected in a push-pull configuration to generate the large current swings required for motor operation. This push-pull arrangement can be seen in the National Semiconductor data sheet for the LM675 Operational Amplifier, which is the type of operational amplifier used in the preferred embodiment. Two adjustments are shown in this schematic, a current feedback gain adjustment using potentiometer (74), and a loop gain adjustment using potentiometer (76). The standard power supply for this circuit and its connections are omitted for clarity. The reference voltage VR is either zero volts for a standard dual polarity supply, such as a +/−15 Volt power supply, or is one half of the supply voltage if a single ended supply is used.

Operation of the Invention

The method of operation of the preferred embodiment of the invention is now described. Referring to FIG. 1, the component of the magnetic field impinging on the Hall-effect sensor that is generated by the current through the motor coils (24) is shown as the wavy arrow (38). This component is variable, depending on the direction of the motor current and its amplitude at any moment. The other component of the magnetic flux sensed by the Hall-effect sensor is that due to the angular position and its relationship to the magnetomotive force generated at the magnetic structure being sensed. This position flux is shown as the straight arrow at (36). If the influence of the unwanted flux from the motor windings on the system is considered without correction, it can readily be seen that the feedback from the Hall-effect sensor would be very unreliable because it would be a function of both position and motor current. Since accurate position feedback form the Hall-effect sensor is further processed in a closed loop control to develop the error signal which determines the motor current, it can be readily seen that the portion of the Hall-effect sensor feedback which represents the motor current is an unwanted feedback term. This term might be either positive or negative, depending on a number of variables such as the geometry of the Hall-effect sensor in relation to the motor coils. If it is positive feedback, it is well known that circuit instability may develop which would make it impossible to stabilize the position control loop. If negative feedback, significant inaccuracy under load and unwanted dynamic damping of the control loop will result. If the magnitude of the unwanted current feedback form the Hall-effect sensor is small, it might be possible to obtain a stable control loop without correction using the teachings of this invention. However, the position accuracy of the system in relation to he commanded position will be a function of the load applied to the actuator, which is clearly an undesirable result.

The electronic system to remove this component of the signal returned from the Hall-effect sensor will now be described. Referring again to FIG. 1, the Hall-effect sensor (18) returns a signal to the second summing amplifier (16) that reflects the sum of the angular position of the motor and the magnetic component generated by the current through the motor field, as discussed above. Meanwhile, the magnitude of the current through the motor coils is sensed by measuring the voltage drop across current sensing resistor (22) using current sensing amplifier (20). This signal is also returned to the second summing amplifier. These two signal are subtracted within the second summing amplifier, such that the output which is provided on signal path (14) contains only the position feedback information. It should be noted that this corrected position signal can be used for other purposes in a specific application; for example, failure monitoring or recording of actuator position information. This corrected signal is then fed to the first summing amplifier (12), along with the command input (10) which is a signal corresponding to the desired position of the actuator. These signals are then subtracted in the first summing amplifier to develop an error signal which is output over signal path (28) to the power amplifier. The power amplifier takes this low-level signal and amplifies it by means of one of a number of well-known techniques into a current to the motor coils with sufficient power to drive the electric motor. It should be noted that, while the description above speaks of the subtraction of various signals in the summing amplifiers, the actual implementation may vary depending on the particular geometry of the application. For example, if the feedback from the Hall-effect sensor is negative with respect to the current feedback in a particular implementation, then the function of the second summing amplifier will be addition, rather than subtraction. The sense of these signals for the specific implementation in the preferred embodiment will be further explained below. Hence, the system has been implemented to remove the undesired current feedback component from the Hall-effect sensor output using a known current feedback signal generated by the controls system. It is well known to those skilled in the art that the control system blocks described above can be re-arranged and combined using the techniques of block diagram algebra, into a number of different combinations without departing from the teachings of this invention.

Since the use of current feedback to correct for the influence of the motor field winding magnetic field on the Hall-effect sensor used for position feedback has been introduced, a brief discussion of the uses of current feedback in the prior art is now provided for comparison. There is a large amount of prior art on the subject of current feedback in various control circuits for motors. Examples of prior art use of current feedback in motors which also use Hall-effect devices include U.S. Pat. 5,382,890 to Moh, et al. and U.S. Pat. No. 5,173,651 to Buckley, et al. Moh uses the Hall-effect sensors for commutation and the current feedback to protect the output FETs used in his electronic circuit. Buckley again uses Hall effect devices for commutation, which he refers to as phase changeover. The current feedback is used to control current to the motor at the time of the phase changeover so as to obtain low torque ripple and other benefits. Current feedback has been used in numerous other motor control circuits in the prior art, with position feedback devices which are undefined. Among the most relevant are: U.S. Pat. No. 4,874,997 to Daggett, et al., U.S. Pat. No. 4,494,051 to Bailey, U.S. Pat. No. 4,751,438 to Markunas, and U.S. Pat. No. 4,644,234 to Nola. The typical use of current feedback in such prior art is to control motor torque. Markunas uses the current feedback in conjunction with position feedback from an unspecified transducer to monitor and correct motor performance in accordance with a function generated to simulate ideal performance. None of the prior art used current feedback to improve the accuracy of a Hall-effect sensor used for position feedback. One other prior art patent of interest is U.S. Pat. No. 5,313,151 to Ogden and Pearce. They use a Hall-effect device to deliberately monitor the flux produced by the coil windings in an induction motor so as to measure the torque of the motor. There is no disclosure of any use of this information related to position control.

Returning to the method of operation, the method of operation of the position sensing means in the preferred embodiment will now be undertaken. Referring first to FIG. 4, the production by the rotor of the magnetic flux used to generate the position signal is described. The core extension (32) is a part of the soft iron rotor core (54) which is sandwiched between the high coercivity permanent magnets (56) and (58). The interface between the permanent magnets and the rotor core is at opposite magnetic polarities, North and South, on the two sides. Given the high permeability of the soft iron, the magnetomotive force difference between these two interfaces is much less than that generated by the magnets across their poles, but it is sufficient to generate a low level flux field that is well suited to the use of the selected analog Hall effect sensing device. The core extension places this low level flux field outside of the very high flux range of the working magnets, where it can be easily directed into a sensor. Referring to FIG. 2, the core extension is the only part of the rotor (30) which is visible. The Hall-effect sensor (18) can be seen fixed to the stator by the carrier assembly (48), at a position which is a fixed, small distance from the rotor at the outside cylindrical diameter of the core extension. As the rotor rotates through its limited angle, a small flux field is generated which influences the Hall-effect sensor, which in turn provides a voltage signal output. This signal ranges from a maximum positive value when the sensor is closely aligned with one edge of the circular segment formed by the core extension, to a maximum negative value when the sensor is aligned with the other end of the cylindrical segment. At the midpoint of the cylindrical segment, the output of the Hall-effect sensor is theoretically zero, because it is aligned with the magnetic structure of the core extension at a point midway between the North and South poles at a position where the magnetomotive force is zero. It has been found in practice that this arrangement provides a voltage output from the Hall-effect sensor that varies in linear proportion to the angle of rotation within the range of the cylindrical segment of the core extension. Linearity has generally been better than 1% of the full-scale output from the Hall-effect sensor. It has also been found in practice that the intensifier plate, shown in FIG. 3 as (52), provides a slightly improved sensitivity from the Hall-effect sensor in operation. It has also been found in practice that a carrier assembly and Hall-effect sensor configured as shown in the figures and described herein, provides an output which is directly proportional to the current applied through the motor coils. This simplifies the circuit requirements for the control system electronics, as will be explained further, below. However, it will be recognized by those skilled in the art that other position sensing means that incorporates an analog hall effect sensor where it might be influenced by the flux generated y the motor field windings could be substituted for that described above without departing from the teachings of this invention. For example, the position sensors which use analog Hall-effect devices in the prior art could be substituted, or the Hall effect sensor could be placed directly in the working gap of the torque motor.

The operation of the preferred implementation of the invention using simple analog electronics will now be described. Referring to the schematic diagram of FIG. 5, it should be noted that the individual circuits which implement the various elements of the control system are enclosed by dashed lines for comparison to the simplified control system description above. Furthermore, the power supply connections for a circuit of this type are well-known and are eliminated from the figure for clarity. The signal returned from the Hall-effect sensor, which is not shown, enters the second summing amplifier (16). As described previously, this signal contains both the position feedback amplitude and the component generated by the current through the motor coils. The current through the motor coils generates a voltage drop across the current sensing resistor (22) which is fed into a conventional differential amplifier with filtering implemented with operational amplifier (68). This circuit is provided with a potentiometer to attenuate its output (74) so that the magnitude of the current feedback provided can be precisely adjusted to make up for physical differences in the magnetic circuit from one unit to another. Since, for this implementation, the current feedback signal and the Hall-effect sensor signal are opposite in sign, they are added in the second summing amplifier (16), which is implemented as a conventional inverting amplifier with adjustable gain using operational amplifier (66). The gain adjustment is provided as a convenience in this specific implementation. The output signal from this amplifier is, in turn, opposite in sign to the command input at (10), so the signals are added in the first summing amplifier (12), which is implemented as a two-input inverting amplifier using operational amplifier (60). Provisions are made in this circuit for lead and lag compensation of the control loop in a well known method using series capacitor/resistor pairs (62) and (64), for adjustment of the control loop response for particular applications. The error signal output of the first summing amplifier is provided the power amplifier stage (26). This stage is implemented using two high power operational amplifiers (70) and (72) push-pull configuration, which provides maximum voltage swings across the coils in response to the error signal. Finally, the output of this amplifier stage is provided to the series combination of the motor coils and the current sensing resistor. While this simple circuit is optimized for linearly proportional inputs from the Hall-effect sensor responsive to both position changes and motor current changes, it will be recognized that electronic linearization means could be incorporated to accommodate non-linear feedback responsive to either or both of the magnetic inputs without departing from the teachings of this invention.

Figure 6:
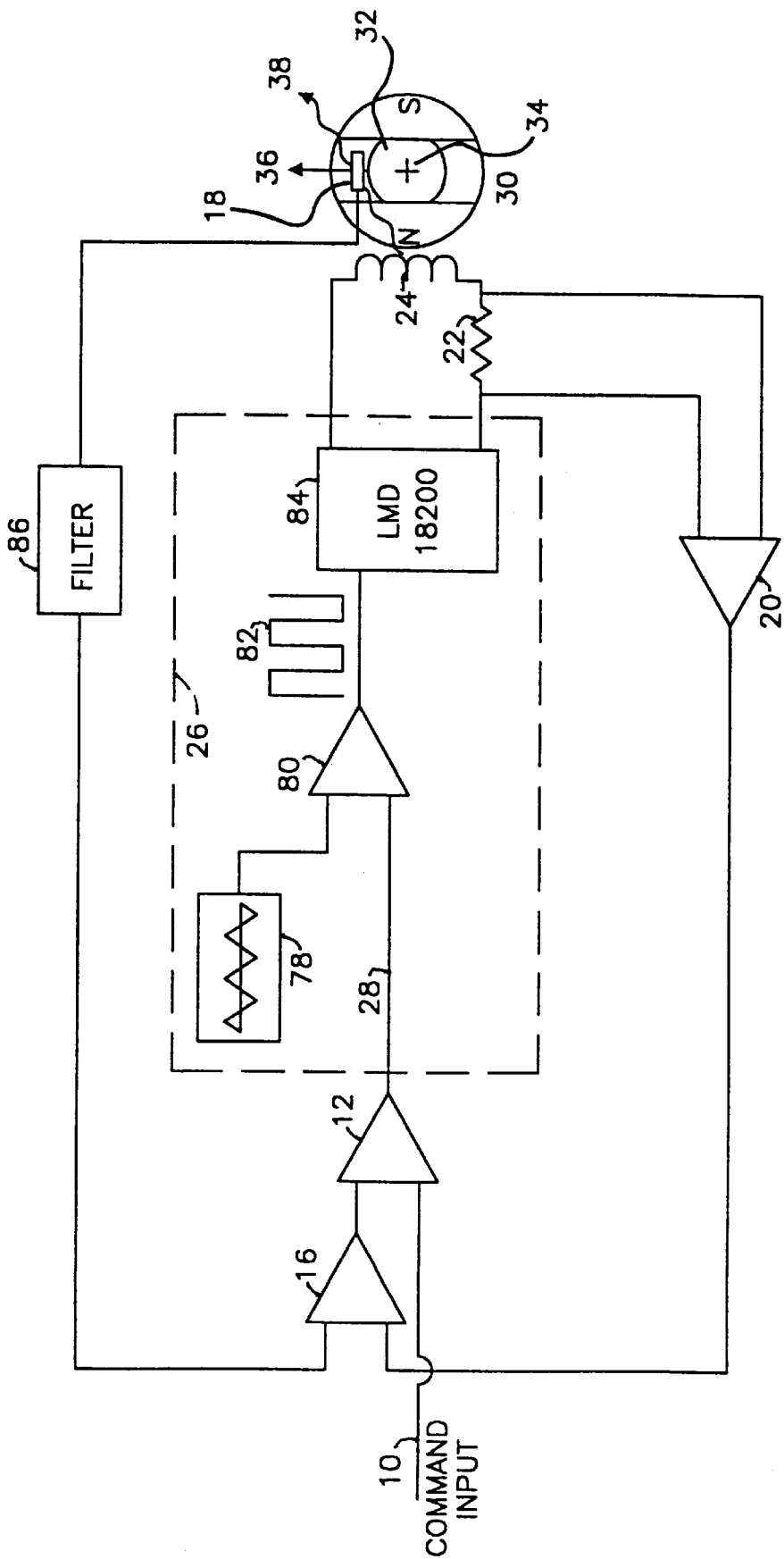
FIG. 6 is a simplified schematic diagram, similar to FIG. 1, for an alternate embodiment using a pulse-width modulated motor driver as the power amplifier.

Obviously, the power amplifier block (26) of FIG. 1 could take a number of alternate forms without departing from the teachings of this invention. For example. it could readily be implemented as a pulse-width modulated, or PWM, amplifier. A block diagram for one potential embodiment using PWM is shown in FIG. 6. Since this embodiment is based on same control loop as the previous analog output embodiment, only the operation of the PWM power amplifier will be explained in detail. The power amplifier (26) uses a triangle wave generator (78) whose output signal goes into a comparator (80), where it is compared to the error signal output (28) of first summing amplifier (12). This comparator provides a switched DC output waveform (82) whose pulse width depends on the magnitude of the error signal fed into the comparator. The output of the comparator could then be fed into a high-current amplifier suitable for pulse width modulated signals such as part number LMD18200 H-bridge manufactured by National Semiconductor of Arlington, Tex. (84). At zero error, the switched DC output has equal times at each voltage extreme, resulting in zero net power into the coil. If the error signal changes, this changes the reference level in the comparator. When the triangle wave from the generator is compared with this new reference level, pulse trains with on-times that are different for the two polarities are produced. This results in a net current to the coil, and the production of torque. The filters in the current feedback amplifier (20) are sized so as to, in combination with the inductance of the coil, provide a good representation of the average current through the coil and ignore the peaks generated by the pulse width modulation. Furthermore, the Hall-effect sensor feedback requires a low-pass filter (86) in this implementation to damp out transients generated by the coils from the pulse-width modulation switching.

Conclusion, Ramifications, and Scope

Thus the reader will see that the invention described herein provides a low cost and simple control system directed for use in limited angle torque motors in position control applications. While the above description contains many specificities, these should not be construed as limitations on the scope of the invention, but rather as exemplification of one preferred embodiment thereof Many other variations are possible. For example, the signals and their processing as described above should not be read as to imply that only analog techniques can be used to accomplish the teachings of this invention. Although the hall-effect sensor signal is analog by nature, this could be readily converted into a digital signal using well-known analog to digital conversion methods for processing by a digital circuit or a microprocessor under software control. Furthermore, it would be straightforward in such a microprocessor-based embodiment to synthesize the current feedback signal now provided by the current sensing circuit, using a lookup table in software or the like, such that the physical current feedback can be eliminated from the circuit in favor of a virtual current feedback which depends on the command output to the power amplifier.

Accordingly, the scope of the invention should be determined not by the embodiments illustrated, but by the appended claims and their legal equivalents.

I claim:

1. A limited-angle torque motor comprising:

a brushless DC torque motor comprising a rotor and a stator, said rotor being a moving element comprising a permanent magnet with at least one set of magnetic poles, said stator being a stationary element containing electrical coils and a magnetically permeable structure arranged so as to cause a torque to be exerted on the rotor when said coils are energized with an electric current, said stator having an analog hall effect sensor affixed by a mount thereto, said rotor having a magnetic field generator to generate a magnetic field for excitation of said hall effect sensor, said magnetic field generator and said hall effect sensor being positioned proximate to said stator in the magnetic field thereof such that rotation of said rotor with respect to said stator generates an electrical position feedback signal from said hall effect sensor which varies with the rotational position of said rotor, current sensor to determine the amount of electrical current being applied to said electrical coils and providing a current feedback signal proportional thereto, an electrical position command signal which is proportional to a desired, stationary angular position of said limited angle torque motor, electronic amplifier for subtracting said current feedback signal from said position feedback signal to produce a corrected position feedback signal, said electronic amplifier further comparing said corrected position feedback signal and said position command signal such that a position error output is created which is related to the difference between said corrected position feedback signal and said position command signal, said electronic amplifier further providing a current output to said brushless DC torque motor to effect the production of torque therein to position the rotor at the desired, stationary position, whereby hall-effect feedback of motor position can be used without regard to extraneous magnetic fields generated by current in the motor coils.

2. A limited-angle torque motor as in claim 1 wherein said magnetic field generator comprises a magnetically permeable structure attached to and exposed to the magnetic field of said permanent magnet, wherein said primary magnetic field is attenuated and reflected to the vicinity of said hall effect sensor.

3. A limited-angle torque motor as in claim 2 wherein said magnetically permeable structure comprises an extended portion of the soft-iron core to which a pair of primary magnets are bonded.

4. A limited-angle torque motor as in claim 1 wherein said magnetic field generator comprises a separate permanent magnet affixed to the rotor such that a magnetic field is created in the vicinity of said hall effect sensor.

5. A limited-angle torque motor as in claim 1 wherein said mount comprises an adhesive for mounting said hall effect sensor directly to said electrical coils.

6. A limited-angle torque motor as in claim 1 wherein:
   a) said mount comprises a magnetically non-permeable structure to which said hall effect sensor is affixed by bonding means,
   b) said non-permeable structure is affixed to said stator of said torque motor.

7. A limited-angle torque motor as in claim 6 wherein:
   a) said electrical coils within said stator have at least one set of exposed ends in the form of a cylinder with an axial cylindrical hole of sufficient diameter to accept said magnetic field production means and provide an additional gap for said mount means to be disposed therein,
   b) said mount comprises a magnetically non-permeable structure in a hollow cylindrical shape, the outer surface of which is substantially the same diameter as the inner surface of the cylindrical end windings of said torque motor,
   c) said non-permeable structure also having a rectangular notch disposed on the perimeter thereof, said notch being parallel to the central axis of said hollow cylindrical shape;
   d) said notch being of a size to accept said hall effect sensor with an appropriate gap for adhesive bonding thereof,
   e) said hall effect sensor being adhesively bonded to said non-permeable structure,
   f) said non-permeable structure being adhesively bonded to said inner surface of said cylindrical end windings, whereby said hall effect sensor can be more strongly and reliably adhered to said electrical coils.

8. A limited-angle torque motor as in claim 1 further including a magnetically permeable plate disposed so as to sandwich said hall effect sensor between said plate and said magnetic field generator whereby the magnetic flux through said hall effect sensor is focused.

9. A limited-angle torque motor as in claim 1 wherein said electronic amplifier provides said current output to said torque motor as an analog output.

10. A limited-angle torque motor as in claim 1 wherein said electronic amplifier provides said current output in the form of a pulse-width modulated current output of constant amplitude and varying duration, said varying duration being related to said position error output and said current feedback combination.

* * * * *